US011255418B2

(12) United States Patent
Buratowski et al.

(10) Patent No.: US 11,255,418 B2
(45) Date of Patent: Feb. 22, 2022

(54) POWERTRAIN FOR A MOTOR VEHICLE, DIFFERENTIAL PLANETARY GEAR SYSTEM FOR A POWERTRAIN, AND MOTOR VEHICLE COMPRISING A POWERTRAIN

(71) Applicants: AUDI AG, Ingolstadt (DE); Profiroll Technologies GmbH, Bad Düben (DE)

(72) Inventors: Philipp Buratowski, Ingolstadt (DE); Markus Heilmann, Munich (DE); Michael Hirsch, Leipzig (DE); Christian Weihmann, Leipzig (DE); Peter Strehmel, Leipzig (DE)

(73) Assignees: AUDI AG, Ingolstadt (DE); Profiroll Technologies GmbH, Bad Düben (DE)

( * ) Notice: Subject to any disclaimer, the term of this patent is extended or adjusted under 35 U.S.C. 154(b) by 11 days.

(21) Appl. No.: 16/606,914

(22) PCT Filed: Apr. 23, 2018

(86) PCT No.: PCT/EP2018/060375
§ 371 (c)(1),
(2) Date: Oct. 21, 2019

(87) PCT Pub. No.: WO2018/197431
PCT Pub. Date: Nov. 1, 2018

(65) Prior Publication Data
US 2020/0191248 A1 Jun. 18, 2020

(30) Foreign Application Priority Data
Apr. 26, 2017 (DE) ...................... 10 2017 207 047.1

(51) Int. Cl.
*F16H 48/10* (2012.01)
*F16H 48/08* (2006.01)
(Continued)

(52) U.S. Cl.
CPC ............. *F16H 48/10* (2013.01); *F16H 48/08* (2013.01); *F16H 57/08* (2013.01); *B60K 17/165* (2013.01);
(Continued)

(58) Field of Classification Search
CPC .......... F16H 48/10; F16H 57/08; F16H 48/06; F16H 1/28; F16H 2048/02; B60K 17/165; B60K 17/346; B60K 17/348
(Continued)

(56) References Cited

U.S. PATENT DOCUMENTS 1,730,184 A * 10/1929 Wildhaber ............. F16H 48/10
475/226
2,080,477 A * 5/1937 Higgins .................. F16H 48/30
475/250
(Continued)

FOREIGN PATENT DOCUMENTS

CH 237300 A 4/1945
DE 2453964 B1 5/1976
(Continued)

OTHER PUBLICATIONS

English translation of DE3938888A1; http://translationportal.epo.org; Dec. 8, 2020 (Year: 2020).*
(Continued)

*Primary Examiner* — Roger L Pang
(74) *Attorney, Agent, or Firm* — Maier & Maier, PLLC

(57) ABSTRACT

A powertrain for a motor vehicle, with a differential planetary gear system, which has at least one ring gear with ring gear toothing, at least one sun gear with sun gear toothing, planetary gears which engage with the ring gear toothing on one side and with the sun gear toothing on the other side, and a planetary gear carrier, on which the planetary gears are rotatably mounted. The ring gear toothing and the sun gear
(Continued)

toothing have the same number of respective gear wheel teeth.

10 Claims, 1 Drawing Sheet

(51) Int. Cl.
*F16H 57/08* (2006.01)
*B60K 17/16* (2006.01)
*F16H 48/00* (2012.01)
*F16H 1/28* (2006.01)
*B60K 17/348* (2006.01)
*B60K 17/346* (2006.01)

(52) U.S. Cl.
CPC .......... *B60K 17/346* (2013.01); *B60K 17/348* (2013.01); *F16H 1/28* (2013.01); *F16H 2048/02* (2013.01)

(58) Field of Classification Search
USPC .......................................................... 475/177
See application file for complete search history.

(56) References Cited

U.S. PATENT DOCUMENTS

| | | | | |
|---|---|---|---|---|
| 3,292,456 A | * | 12/1966 | Saari | F16H 48/22 475/226 |
| 3,899,938 A | * | 8/1975 | Crabb | B60K 17/3462 475/86 |
| 4,014,224 A | * | 3/1977 | Pitts | F16H 1/32 475/176 |
| 2011/0143880 A1 | * | 6/2011 | Minadeo | F03D 15/00 475/346 |
| 2018/0112716 A1 | * | 4/2018 | Jorgensson | F16H 47/00 |

FOREIGN PATENT DOCUMENTS

| | | |
|---|---|---|
| DE | 3938888 A1 | 6/1990 |
| DE | 102009032286 A1 | 6/2010 |
| DE | 102010025274 A1 | 12/2011 |
| DE | 102012219212 A1 | 4/2014 |
| EP | 2998615 A2 | 3/2016 |
| WO | 2012/041551 A1 | 4/2012 |

OTHER PUBLICATIONS

English translation of the International Preliminary Report of Patentability dated Nov. 7, 2019, in corresponding International Application No. PCT/EP2018/060375; 11 pages.

German Examination Report dated Apr. 6, 2018 in corresponding German Application No. 10 2017 207 047.1; 10 pages.

International Search Report and Written Opinion dated Aug. 8, 2018 in corresponding International Application No. PCT/EP2018/060375; 30 pages.

* cited by examiner

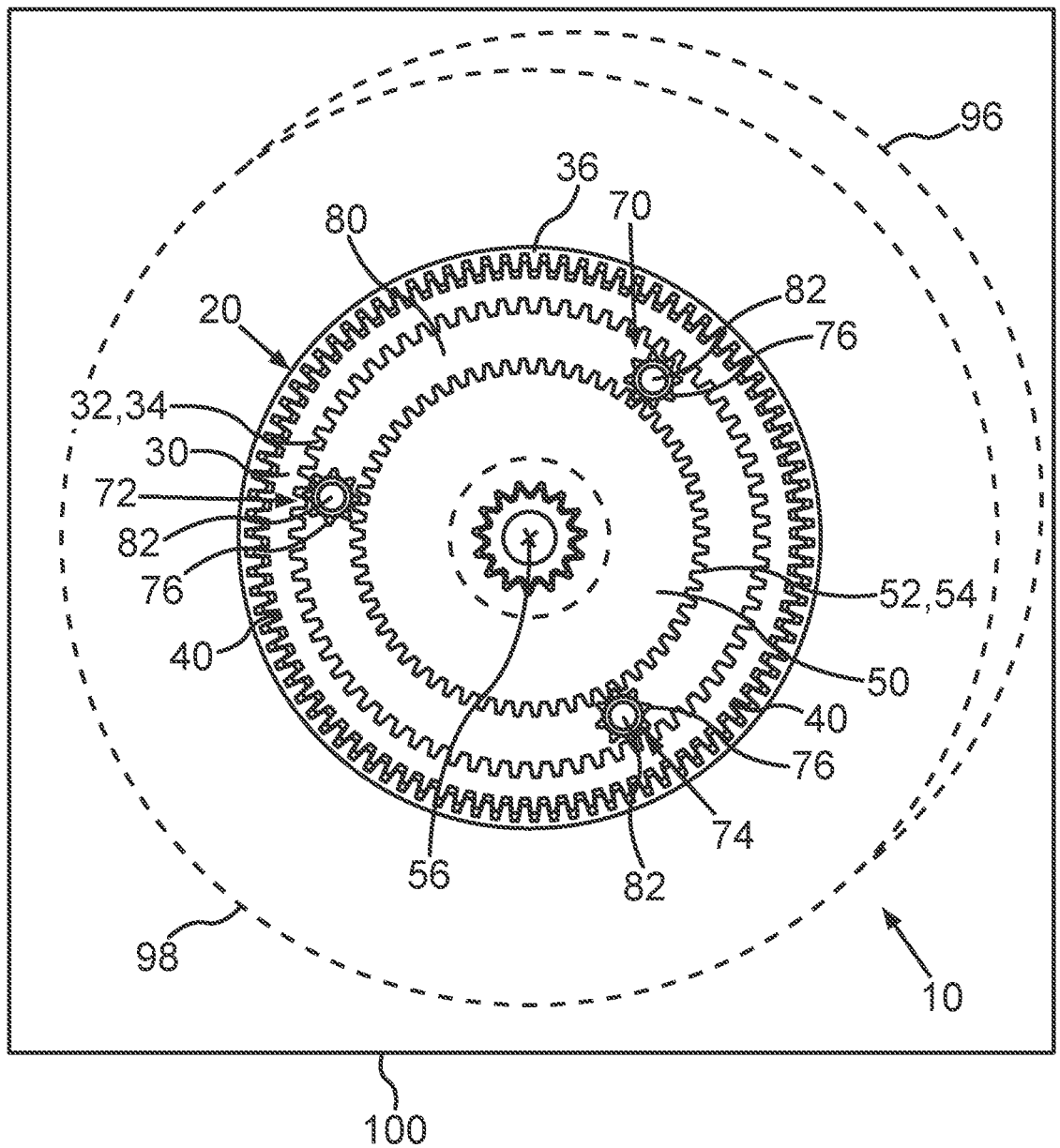

POWERTRAIN FOR A MOTOR VEHICLE, DIFFERENTIAL PLANETARY GEAR SYSTEM FOR A POWERTRAIN, AND MOTOR VEHICLE COMPRISING A POWERTRAIN

FIELD

The invention relates to a powertrain for a motor vehicle, with a differential planetary gear system, which has at least one ring gear with ring gear toothing, at least one sun gear with sun gear toothing, planetary gears, which engage with the ring gear toothing on one side and with the sun gear toothing on the other side, and a planetary gear carrier, on which the planetary gears are rotatably mounted. Further aspects of the invention relate to a differential planetary gear system for a powertrain as well as a motor vehicle with a powertrain.

BACKGROUND

Such powertrains are widely known in motor vehicle manufacturing, and particularly in series production, and are used to implement a torque distribution, for example of a drive torque, via the differential planetary gear system. Depending on the design, various torque distributions can be provided to a sun gear, planetary gears, as well as a ring gear of the differential planetary gear system.

DE 39 38 888 A1 discloses a transfer case with a planetary gear unit. The planetary gear unit is used to distribute torque to an output shaft for a front axle and a rear axle. An output to the rear axle occurs via an output shaft drivingly connected to a ring gear of the planetary gear unit, while an output for the front axle occurs via a sun gear of the planetary gear unit as well as via the output shaft.

DE 10 2009 032 286 A1 describes a spur gear differential with a first sun and a second sun, wherein a first set of planetary gears is assigned to the first sun and a second set of planetary gears is assigned to the second sun.

CH 237300 A describes a self-locking spur gear differential. The differential has differential gears, the toothing of which is formed as stub gear toothing.

SUMMARY

The object of the present invention is to obtain a powertrain for a motor vehicle, which has an especially flexibly usable differential planetary gear system. A further object of the invention is the provision of a differential planetary gear system for such a powertrain as well as a motor vehicle with such a powertrain.

The invention originates from a powertrain for a motor vehicle with a differential planetary gear system. The differential planetary gear system has at least one ring gear with ring gear toothing, at least one sun gear with sun gear toothing, planetary gears, which engage with the ring gear toothing on one side and with the sun gear toothing on the other side, and a planetary gear carrier, on which the planetary gears are rotatably mounted. The differential planetary gear system may be formed, for example, as a spur gear differential, wherein, accordingly, the ring gear toothing, the sun gear toothing, as well as the respective planetary gear toothing of the planetary gears may be designed as the respective spur gear toothing. The differential planetary gear system enables the arrangement of the planetary gears as well as of the sun gear within a ring gear, whereby, as a whole, an especially compact arrangement can be achieved.

According to the invention, it is provided that the ring gear toothing and the sun gear toothing have the same number of respective gear wheel teeth. In other words, the ring gear toothing may have a particular number of ring gear teeth, which corresponds to a corresponding number of sun gear teeth of the sun gear toothing. The planetary gear carrier may be driven by a driving engine, for example by an internal combustion engine or by an electric motor of the powertrain, i.e. it may be or can be coupled with the corresponding driving engine so as to transfer torque. To this end, a clutch coupling may be arranged between the driving engine and the planetary gear carrier.

Due to the same numbers of respective gear wheel teeth, the respective transmission ratios between the sun gear and the planetary gears as well as between the planetary gears and the ring gear are equal. Due to the respectively same number of respective gear wheel teeth, a drive torque provided by the driving engine can be evenly distributed to the ring gear and the sun gear via the planetary gear carrier and the planetary gears, such that the sun gear and the ring gear can be driven with the same respective portion of torque, for example of the drive torque. It is thereby even possible to propel drive wheels, opposite one another, of an axle of the powertrain by means of the ring gear and the sun gear such that the planetary gear differential can be used even as an axle differential. In contrast with the differential gears known from the prior art, the differential planetary gear system can thus not only be used for torque distribution between respective front axles and rear axles of the powertrain but also for torque distribution between drive wheels, which are axially aligned with one another, of a single axle, whereby the differential planetary gear system as a whole can be used especially flexibly.

The ring gear toothing and the sun gear toothing may have a respective number of teeth of the respective gear wheel teeth in a range of, for example, 50 to 200 teeth. The planetary gears may have a respective number of planetary wheel teeth in a range of, for example, 10 to 30 teeth. Such numbers of teeth enable an especially compact design of the differential planetary gear system as well as an especially need-based power distribution, for example, from the planetary gear carrier to the sun gear and the ring gear. The compact design results in a weight reduction compared to axle differentials known from prior art.

In an advantageous further embodiment of the invention, the ring gear toothing and the sun gear toothing have the same module. In other words, the ring gear toothing and the sun gear toothing may thereby have the same gear wheel division (interval between two adjacent teeth). The module represents a dimension for the respective size of the ring gear teeth of the ring gear toothing or the sun gear teeth of the sun gear toothing, respectively. Due to the fact that the ring gear toothing and the sun gear toothing have the same module, an especially uniform load transfer from the planetary gears to the ring gear toothing as well as to the sun gear toothing can be achieved when the differential planetary gear system is driven. The module may preferably be in a module range of from 0.5 mm to 2.5 mm.

In a further advantageous further embodiment of the invention, at least the ring gear toothing and the sun gear toothing are formed as respective stub gear toothing. This is advantageous, because there is especially extensive freedom when designing the differential planetary gear system due to the formation of the stub gear toothing. Preferably, the respective stub gear toothing is formed as rolled stub gear toothing, which can be produced with especially low production effort and thus especially economically. "Rolled stub gear toothing" should be understood to mean particularly stub gear toothing shaped through rolling. The respective stub gear toothing can also be produced by means of a rolling method shaping the ring gear and/or the sun gear at least in areas. In an especially advantageous manner, a large addendum modification of the respective toothing can be achieved by means of the stub gear toothing, because the stub gear toothing enables a large degree of design freedom when selecting the undercut limit and the top land limit of the toothing.

In a further advantageous further embodiment of the invention, the respective stub gear toothing has a respective tooth height, which is less than 1.2 times the module, particularly less than the module. This is advantageous, because stub gear toothing with such a low tooth height can be designed especially compact as a whole. The lower the tooth height, the smaller the differential planetary gear system can be dimensioned in its radial extension direction, such that the differential planetary gear system as a whole may be arranged in the motor vehicle in an especially space-saving manner. Furthermore, a weight reduction can likewise be achieved due to this tooth height in comparison to axle differentials known from the prior art.

In a further advantageous further embodiment of the invention, the planetary gears engage with the ring gear toothing and the sun gear toothing with a suspension of axial forces. This is advantageous, because especially low bearing forces, as a whole, act on respective bearing bolts, for example, by means of which the planetary gears can be rotatably accommodated on the planetary gear carrier. The suspension of the axial forces may be achieved, for example, in that respective toothing helix angles of the ring gear toothing and of the sun gear toothing can be selected and matched to one another such that first axial forces acting between the ring gear toothing and the planetary gears and second axial forces acting between the sun gear toothing and the planetary gears cancel each other out.

In a further advantageous further embodiment of the invention, the ring gear toothing and the sun gear toothing are formed as respective helical gearing, double helical gearing, herringbone gearing, bevel gearing, or double angle gearing. These types of toothing are advantageous, because a low transverse contact ratio can be at least extensively compensated and advantageously an overlap ratio can be generated due to the respective helix angles of these types of toothing.

In a further advantageous further embodiment of the invention, the ring gear is coupled to a first drive wheel of the powertrain and the sun gear is coupled to a second drive wheel of the powertrain in a torque-transferring manner. By means of this coupling, an especially favorable load distribution is provided over the differential planetary gear system in that the radially external ring gear drives the first drive wheel and the radially internal sun gear drives the second drive wheel. The differential planetary gear system may preferably be designed as an axle differential of an axle, by means of which the two drive wheels, which are aligned axially with one another, can be driven. For example, the axle may be designed as a front axle or as a rear axle of the motor vehicle.

In a further advantageous further embodiment of the invention, the ring gear has external toothing, by means of which the ring gear is coupled to the first drive wheel in a torque-transferring manner, and the sun gear has internal toothing, by means of which the sun gear is coupled to the second drive wheel in a torque-transferring manner. This is advantageous because an especially space-saving and direct transfer of torque to the respective drive wheels is enabled by means of the external toothing of the ring gear and/or the internal toothing of the sun gear. The external toothing may be engaged with a hollow shaft element, which is coupled to the first drive wheel, with said hollow shaft element possibly having the shape, for example, of a bell, and which may have hollow shaft internal toothing complementary to the external toothing. The internal toothing may be engaged with a shaft element, which is coupled to the second drive wheel, with said shaft element possibly having external shaft toothing complementary to the internal toothing. The internal toothing and the external shaft toothing of the shaft element may preferably form a shaft-hub connection in the form of a spline. However, further types of connection such as, for example, polygonal connections as well as welded constructions may be selected.

A second aspect of the invention relates to a differential planetary gear system for a powertrain. The features presented in connection with the powertrain according to the invention as well as the advantages thereof apply accordingly to the differential planetary gear system according to the invention and vice versa.

A third aspect of the invention relates to a motor vehicle with a powertrain. The features presented in connection with the powertrain according to the invention and the differential planetary gear system according to the invention as well as the advantages thereof apply accordingly to the motor vehicle according to the invention and vice versa.

BRIEF DESCRIPTION OF THE DRAWINGS

Additional features of the invention result from the claims, the exemplary embodiment, and by means of the drawing. The features and feature combinations listed previously in the description as well as the features and feature combinations listed in the exemplary embodiment in the following can be used not only in the respectively indicated combination, but also in other combinations, or in isolation, without going beyond the scope of the invention.

In doing so, the single FIGURE shows a schematic perspective view of a powertrain with a differential planetary gear system, which is arranged in a motor vehicle.

DETAILED DESCRIPTION

The figure shows a motor vehicle 100, which is only indicated schematically here, with a powertrain 10, which has a differential planetary gear system 20. The differential planetary gear system 20 here is designed as an axle differential and is used to drive two drive wheels 96, 98, which are arranged in alignment with one another, of a drive axle of the powertrain 10.

The differential planetary gear system 20 has a ring gear 30 with ring gear toothing 32, a sun gear 50 with sun gear toothing 52, three planetary gears 70, 72, 74, which are engaged with the ring gear toothing 32 on one side and with the sun gear toothing 52 on the other side by means of respective planetary gear toothing 76, as well as a planetary gear carrier 80, on which the planetary gears 70, 72, 74 are rotatably mounted by means of the respective bearing bolts 82. The ring gear toothing 32 comprises ring gear teeth 34 and the sun gear toothing 52 comprises sun gear teeth 54. The number of ring gear teeth 34 and of sun gear teeth 54 is identical such that the ring gear toothing 32 and the sun gear toothing 52 accordingly have the same number of respective gear wheel teeth (ring gear teeth 34, sun gear teeth 54). Furthermore, the ring gear toothing 32 and the sun gear toothing 52 have the same module.

The ring gear toothing 32 and the sun gear toothing 52 are formed as respective stub gear toothing and particularly as rolled stub gear toothing. In an especially advantageous manner, a large addendum modification of the respective toothing can be achieved by means of the respective stub gear toothing, because the stub gear toothing enables a large degree of design freedom when selecting the undercut limit and the top land limit of the toothing.

The respective stub gear toothing has a tooth height, which may be less than 1.2 times the module. In particular, the tooth height of the respective stub gear toothing may be less than the module of the ring gear toothing 32 and the sun gear toothing 52, whereby the differential planetary gear system 20 as a whole may be designed as particularly compact, at least in its radial extension direction.

The planetary gears 70, 72, 74 are engaged with the ring gear toothing 32 and the sun gear toothing 52 via the respective planetary gear toothing 76, with suspension of axial forces. To this end, the ring gear toothing 32 and the sun gear toothing 52 are designed as complementary toothing. The ring gear toothing 32 and the sun gear toothing 52 may be designed accordingly as types of toothing complementary to one another, which may include helical gearing, double helical gearing, herringbone gearing, bevel gearing, or double angle gearing.

As shown in the FIGURE, the ring gear 30 is coupled to the first drive wheel 96 of the powertrain 10 and the sun gear 50 is coupled to the second drive wheel 98 of the powertrain 10 in a torque-transferring manner. To this end, the ring gear 30 has external toothing 40, by means of which the ring gear 30 is coupled to the first drive wheel 96 in a torque-transferring manner. The sun gear 50, on the other hand, has internal toothing 60, by means of which the sun gear 50 is coupled to the second drive wheel 98 in a torque-transferring manner.

By means of the external toothing 40, torque can be transferred to a hollow shaft element 36, which is coupled to the first drive wheel 96. The hollow shaft element 36 may be designed in the shape of a bell in areas such that the ring gear 30 may be enclosed by the hollow shaft element 36, at least in areas. The internal toothing 60 of the sun gear 50, on the other hand, may be coupled to a shaft element 56 in a torque-transferring manner, wherein the shaft element 56 may be coupled to the second drive wheel 98, as is shown in the FIGURE.

The differential planetary gear system 20 generally has an especially compact design as well as few components as compared to the differentials known from the prior art due to the stub gear toothing.

The planetary gear carrier 80 may be coupled to a driving engine, which is not shown in further detail, of the powertrain 10 in a torque-transferring manner, wherein an entire drive power applied by the driving engine can be transferred by means of the planetary gear carrier 80 via the individual planetary gears 70, 72, 74 and advantageously via the entire width of gearing of the respective toothing (ring gear toothing 32, sun gear toothing 52, planetary gear toothing 76). The respective toothing (stub gear toothing) may preferably be produced in an especially beneficial manner accordingly through forming, for example through a shaping rolling method. A large addendum modification of the respective toothing can be achieved by the stub gear toothing, whereby particularly the same number of teeth and the same module can be achieved for the ring gear toothing 32 of the ring gear 30 and for the sun gear toothing 52 of the sun gear 50, although the ring gear 30 and the sun gear 50 have different diameters.

The invention claimed is:

1. A powertrain for a motor vehicle, comprising:
a differential planetary gear system, which has at least one ring gear with ring gear toothing, at least one sun gear with sun gear toothing, planetary gears, which engage with the ring gear toothing on a first side and with the sun gear toothing on a second side, and a planetary gear carrier on which the planetary gears are rotatably mounted,
wherein the ring gear toothing and the sun gear toothing have the same number of respective gear wheel teeth, and the ring gear toothing and the sun gear toothing are equally spaced about a respective circumference of the at least one ring gear and the at least one sun gear,
wherein at least the ring gear toothing and the sun gear toothing are formed as stub gear toothing,
wherein the ring gear is coupled to a first drive wheel of the powertrain and the sun gear is coupled to a second drive wheel of the powertrain in a torque-transferring manner, and
wherein the ring gear has external toothing, by which the ring gear is coupled to the first drive wheel in a torque-transferring manner, and the sun gear has internal toothing, by which the sun gear is coupled to the second drive wheel in a torque-transferring manner.

2. The powertrain according to claim 1, wherein the stub gear toothing is a rolled stub gear toothing.

3. The powertrain according to claim 2, wherein the stub gear toothing has a tooth height which is less than 1.2 times a module of the stub gear toothing.

4. The powertrain according to claim 1, wherein the planetary gears are engaged with the ring gear toothing and the sun gear toothing, with suspension of axial forces.

5. The powertrain according to claim 1, wherein the ring gear toothing and the sun gear toothing are formed as one of a helical gearing, double helical gearing, herringbone gearing, bevel gearing, or double angle gearing.

6. The powertrain according to claim 1, wherein the external toothing of the ring gear is engaged with a hollow shaft element, which is coupled to the first drive wheel.

7. The powertrain according to claim 6, wherein the hollow shaft element is configured in a bell shape.

8. The powertrain according to claim 6, wherein the ring gear is at least partially enclosed by the hollow shaft element.

9. The powertrain according to claim 1, wherein the external toothing is provided on an outer diameter of the ring gear which is greater than an inner diameter of the ring gear at which the ring gear engages with the planetary gears.

10. The powertrain according to claim 1, wherein the external toothing of the ring gear is provided on a same axial plane as the ring gear.

* * * * *